Feb. 6, 1968    G. GRAU    3,367,733
APPARATUS FOR MODULATING LASER RADIATION
Filed Oct. 23, 1963
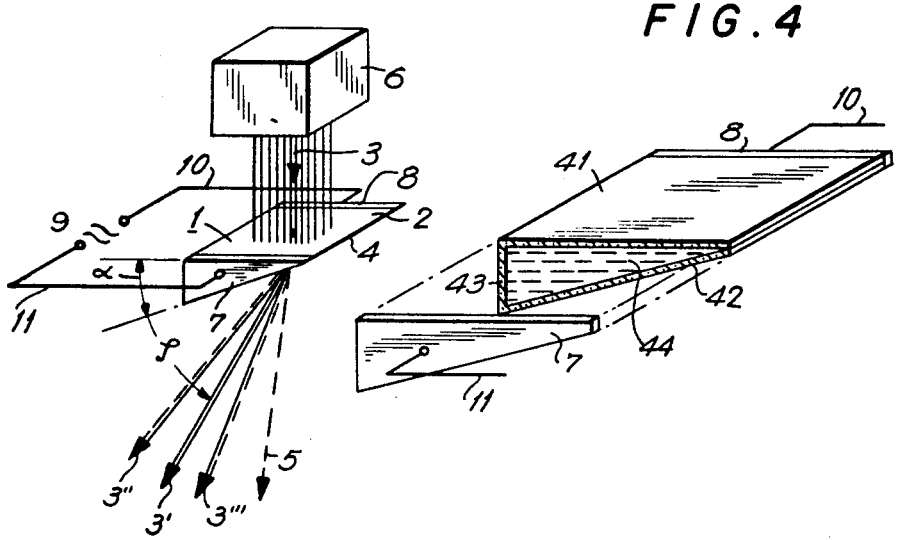
FIG. 1
FIG. 4
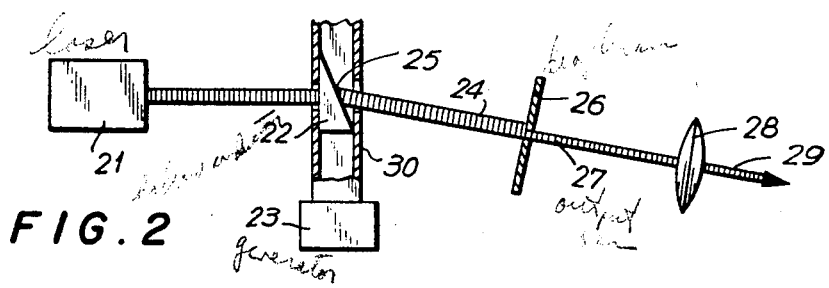
FIG. 2
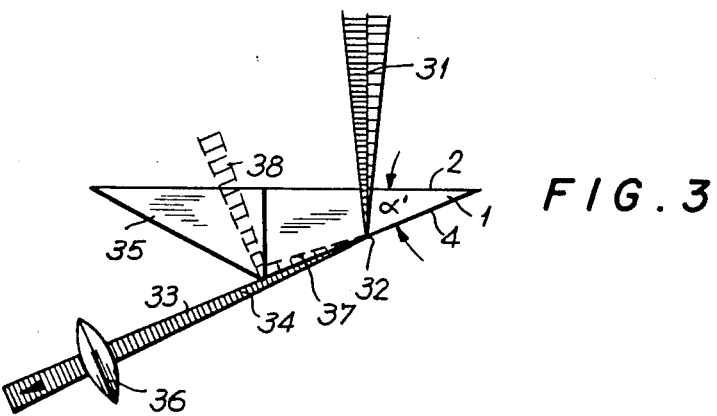
FIG. 3

United States Patent Office 3,367,733
Patented Feb. 6, 1968

3,367,733
APPARATUS FOR MODULATING
LASER RADIATION
Gerhard Grau, Munich, Germany, assignor to Siemens
Aktiengesellschaft, a corporation of Germany
Filed Oct. 23, 1963, Ser. No. 318,458
Claims priority, application Germany, Oct. 25, 1962,
S 82,175
4 Claims. (Cl. 350—160)

ABSTRACT OF THE DISCLOSURE

A monochromatic laser beam is projected through a deflector prism of solid material which has an electrical or magnetic field-responsive refraction index. The laser beam is deflected by the deflector prism at an angle of deflection having a vertex at a surface of the deflector prism. The radiation beam collector has an input focal point coincident with the vertex of an angle of deflection of the laser beam from the deflector prism.

My invention relates to a method for modulating laser radiation by controllably deflecting optical radiation, issuing from a laser.

It is an object of my invention to devise a method that provides controlled modulation of an optical monochromatic beam in a manner comparable, in principle and purposes, with electrical and magnetic deflection of electron or ion rays.

It is another object of my invention to provide a method and means for subjecting a beam of light to high-freqency modulation, for example in the range above one megacycle per second. Another, related object, is to provide controlled angular deflection of a beam of light up to a miximum limit frequency in the order of $10^{+12}$ cycles per second.

Still another object of the invention is to provide a high-frequency modulation with respect to the amplitude or intensity of a light beam.

To achieve the above-mentioned objects and in accordance with a feature of my invention, I deflect or modulate bunched monochromatic and preferably linearly polarized radiation, such as issues from a laser, with a gas, liquid or solid refraction material having a field-responsive refraction index, i.e. a refractory power that varies with the strength of an electric or magnetic field to which the material is subjected. The monochromatic beam to be controllably deflected is passed through a prism of such material, and the field strength in the material is varied in accordance with the desired angle of refraction. More particularly, this is accomplished by providing the material, or the prism formed thereby, with two non-parallel interfaces traversed by the beam of monochromatic radiation, and at least one of the angles of incidence and refraction must differ from a right angle. Deflection control is obtained from magnetic as well as electric fields whose variation causes the refractive power of the material to vary accordingly. This utilizes the Kerr effect, the Cotton-Mouton effect, and the Voigt effect. According to the latter, a liquid, such as nitrobenzol, when exposed to an electric or magnetic field, becomes birefringent, i.e. double-refracting, that is the refraction index of the material becomes directionally dependent upon the field intensity. In many materials, a natural birefringence or double refraction, already existing in the field-free condition, is controllable by the field, so that an optically mono-axial substance becomes optically bi-axial, this being the case, for example, with potassium dihydrogen phosphate (KDP) and related crystals.

A monochromatic beam, when entering from one medium into the material having field-responsive refractory power, or when emerging from the material into a different medium which may have the same properties as the first medium and, like the former, may consist of air, is subjected to refraction at each interface. The refraction at each face is in accordance with the law:

$$\sin \varphi_1 = n \cdot \sin \varphi_2$$

wherein $n = n_1/n_2$, and $n_1$, $n_2$ denote the respective refraction indices, applying to the wave-normal direction of the two media traversed by the beam when passing through an interface, and $\varphi_1$, $\varphi_2$ denote the angles of incidence and refraction (emergence) of the respective wave-normal directions of the beams measured between the perpendicular line drawn upon the direction of incidence and the direction of refraction (emergence) respectively on the one hand and the wave-normal direction in the two media on the other hand. Consequently, this refraction is dependent upon the refraction indices $n_1$ and $n_2$. If the radiation passing through the refraction-controllable material is to be shifted not only in parallel relation to itself, the interfaces at the localities of beam incidence and beam emergence in the material must be inclined relative to each other. In other words, the refraction-controllable material must constitute a prism. In the event liquids are employed as the refraction-controllable material, wedge-shaped containers are preferably employed. Such containers may consist of planar-parallel plates arranged and joined with each other in accordance with the above-mentioned interfaces.

Under the conditions just mentioned, the controllable variation imposed by an electric or magnetic field upon the refraction index produces a controllable angular deflection of the beam. By applying an alternating field, the deflection of the radiation can be controlled at high frequency. This is of particular interest with respect to a high-frequency deflection in the range above one megacycle, especially in conjunction with an electrical deflection because a useful controllable deflection of this kind cannot be obtained by any mechanical means. For a deflection at extremely high frequency, it is further preferable, according to the invention, to employ refraction-controllable solid bodies, as will be more fully described hereinafter, because they afford a higher limit frequency of control, for example at $10^{12}$ c p.s., at a smaller loss angle of the material with respect to the alternating electric field to be applied to the material.

For further describing and explaining the invention as well as the examples for its technological application, reference is made to the further embodiments schematically illustrated by way of example in the accompanying drawing, in which:

FIG. 1 is an explanato y diagram showing a prism traverse by a laser beam and subjected to an electric field for varying the deflection angle of the refracted beam, the material of the crystal having a refractive power dependent upon the strength of the applied field.

FIG. 2 shows a system for imposing a high-frequency modulation upon a monochromatic laser beam applicable for such purposes as the transmission of communications;

FIG. 3 shows a modified system for modulating a beam of light by means of an electric field; and FIG. 4 is an exploded view of a fluid prism.

Further description of the invention will be predominantly directed to electric deflection control in solid bodies, preferably potassium dihydrogen phosphate (KDP). With solid deflection bodies, the electro-optical and the corresponding, analogously identical, magneto-optical effects are more difficult to understand with respect to the practical application of the method. However, it is not intended to limit the method of the invention to the employment of solid bodies and/or the application of electric control fields.

Denoted by 1 in FIG. 1 is a tetragonal KDP crystal of prismatic shape having electrical birefringence, i.e. double-refracting properties. However, in lieu thereof, a cubic copper-chloride crystal may be employed for example, or also other electro- or magneto-optically active crystals, such as hexagonal crystals. The plane 2 is a (110)-face, generally a ($\pm 1.\pm 1.0$)-face of the KDP crystal. In this embodiment, the beam 3 issuing from a laser 6, or other radiation source, impinges perpendicularly upon the interface plane 2, the polarization plane of the beam being parallel to the plane of illustration which preferably coincides with the (001)-plane of the crystal. That is, the plane of polarization is to be perpendicular to the main section plane defined by the beam direction (wave-normal direction) and the optical axis of the field-free crystal. Denoted by 3, therefore, is the ordinary beam in the crystal. This arrangement in which the electro-optical modulus $f_{63}$ is effective, exhibits a particularly great field-strength dependence; that is, the controllable deflection is optimal with respect to a KDP crystal. Since the angle of incidence of the wave-normal direction of beam 3 is perpendicular to the plane of incidence, no refraction occurs at this plane. The beam 3' issued from the crystal when passing through the interface 4 which forms with the plane 2 an angle $\alpha$ differing from 180°, the normals of planes 2 and 4 being in the plane of illustration.

Two electrodes 7 and 8 connecting to a source 9 via leads 10 and 11 apply an electric field to the crystal in the order of 5 to 10 kilovolts/cm.

The refracted beam 3' which in the field-free condition of the crystal issues at the angle $\phi$ becomes deflected in the directions 3" or 3"' when an electric field is applied perpendicularly to the plane of illustration, the direction of deflection being dependent upon that of the applied field. The amount of angular change relative to beam 3' depends upon the field strength and upon the electro-optical constants of the material in accordance with the above-presented equations, as well as upon the angle $\alpha$.

If light of any polarization were caused in the arrangement of FIG. 1 to enter in the direction (110), the proportion of polarization that is perpendicular to the plane of illustration would issue from the prism crystal as another beam 5, whose direction, due to the difference between the directionally dependent indices $n_1$ and $n_3$, departs from the direction of the beam 3' and whose direction of emergence (refraction) would not be electrically controlled in the arrangement of FIG. 1.

The electrically controllable beam corresponding to those denoted by 3', 3", 3"', is available for a number of purposes. For example, on the basis of the electro-optical deflection method according to the invention, a beam of light can be modulated as further shown in FIG. 2 so as to be usable for the transmission of communications, for example.

According to FIG. 2, the radiation issuing from the source 21, for example a laser, passes through a prism 22 as described above. For high-frequency operation above 1 Gc.p.s. the prism is mounted in a hollow conductor or wave guide 30 in a manner adapted to the desired high-modulation frequency, and is electrically connected to the generator 23 of the modulation voltage. The beam 24, having for example a rectangular cross section, passes through the crystal, and a larger or smaller portion of the beam, depending upon the amount of angular deflection, passes through the opening in the wave guide 30 and a diaphragm 26 in form of an amplitude-modulated output beam 27. A cylindrical collector lens 28, having a focal point at 25 can be used, if desired, for compensating the deflection so that the direction of the beam 29 emerging from the lens 28 maintains a constant direction as desired for signal transmission. By suitable choice of the diaphragm opening for a given cross section of the impining beam, any distortion of the modulation due to directional deflection and masking at the diaphragm can be compensated. As a result, the modulation becomes linearly dependent upon the field strength applied to the prism for controlling the beam deflection.

In the embodiment of FIG. 3, in which the same reference numerals as in FIG. 1 are used for corresponding components, the angle $\alpha'$ of the prism 1 is made so large that the beam issues from the crystal at an angle of refraction near total reflection so that the middle ray 33 of the radiation bunch passes closely along the plane 4. It is preferable in such a device, otherwise corresponding to FIG. 1, to employ a beam 31 which is slightly convergent and has a focal point coincident with the point of incidence 32 of its middle ray.

During operation, an electric field is applied to be effective in the crystal, preferably a field having a component perpendicular to the plane of illustration. The plane of incidence of the beam and its middle ray relative to the crystal plane 4 is kept constant. Under these conditions, the electrical field causes the value of the refraction index for the beam 31 in the crystal to reduce or increase the angle for total reflection for the middle ray 31 at the plane 4. That is, a larger or smaller proportion of the beam is subject to total reflection at the plane 4. This reflected proportion 37 is deflected away by an additional optical body 35, such as a prism which deflects the reflected beam 38 away from the refracted portion of the beam, or by other suitable means. The refracted beam 34 emerging at 32 from the crystal, and consequently the total radiation intensity of the issuing beam, can thus be controlled by small field strengths with a modulation degree of up to 100%. A cylindrical collector lens 36, having a focal point at 32, makes the beam issuing from point 32 parallel in the direction that is adjacent to the plane 4 and simultaneously adjacent to the plane of illustration.

It should be noted that the deflection also causes the occurrence of an amplitude or intensity modulation or can be utilized for effecting such a modulation. This is because, according to Fresnel's equations, the energy of incident radiation at an interface is distributed into respective shares passing through the interface and being reflected therefrom at a ratio that depends upon the refraction angles, so that these shares vary with the angle of refractive deflection.

Electrical deflection of optical radiation, particularly monochromatic and preferably sharply concentrated beams of a laser, can be used for directly subjecting optical radiation to electric deflection and for high-frequency pulse or alternating deflection as well as modulating optical radiation at high frequency.

FIG. 4 illustrates a fluid prism having solid transparent faces 41, 42 and 43 holding the fluid, and end faces comprised of electrodes 7 and 8 connected to leads 10 and 11. This prism is suitable for use in FIGS. 1, 2 and 3.

The use of solid bodies, such as KDP crystals, for deflection according to the invention requires only very small amounts of controlling power because KDP, as well as other corresponding solid bodies, exhibits small electric loss angles up to very high frequencies, for example in the order of Gc.p.s., in contrast to electrically doubly refracting liquids.

According to previously known methods, optical radiation, particularly laser radiation, is modulated with electrical birefringence (double refraction) by rotating the polarization plane, and passing the beam along an appreciable distance in a crystal under the effect of an electrical field in order to obtain a discernible result. In contrast thereto, the method of modulating an optical beam according to the invention by deflection has the advantage that for a desired deflection sensitivity only two mutually inclined crystal surfaces are needed and that the beam itself passes through the crystal only along a distance that may be kept as short as desired. Accordingly, the volume of the crystal to be traversed by the electrical field may also be kept very small, so that the losses are slight.

In solid bodies, particularly in monocrystals of optically isotrope and mono-axial substances such as copper chloride or in alkali dihydrogen phosphates and/or alkali hydrogen arsenates, the electro-optical effect is essentially an electrical birefringence (double refraction) caused by an electric field applied in a direction adapted to the crystalline orientation of the substance. The electrical birefringence may be in addition to a natural double refraction. For example, in potassium dihydrogen phosphate (KDP) an electric field acts upon the hydrogen bonds in the crystal and converts the tetragonal structure, which normally prevails at temperatures above the Curie point (123° K.), into a rhombo-hedrical structure. The limit value of the maximal control frequency is high because essentially only the hydrogen bonding in this and similarly structured crystals is influenced by the amplitude of the applied field.

However, other known substances, such as copper chloride, also exhibit a high limit for the frequency of the control effect. In KDP or a crystal of similar structure, normally having the shape of a rotational ellipsoid whose rotational axis is parallel to the c-axis of the crystal, a field changes the index ellipsoid of the refraction indices to a general ellipsoid of which one axis remains parallel to the c-axis and whose two other axes are parallel to the (110)-direction and to the corresponding perpendicular direction in the (001)-plane of the crystal in the field-free condition. Hence, a normally double-refracting (birefringent) KDP crystal, having a single optical axis which extends in the c-direction, thus becomes optically bi-axial in the electric field. That is, the crystal also exhibits electrical double refraction in directions ascertainable from the equation of the index ellipsoid:

$$\sum_{i,j}^{3} 1x_i \cdot A_{ij} \cdot x_j = 1 \quad \text{(Eq. 1)}$$

with the following matrix applicable to KDP:

$$A_{ij} = \begin{bmatrix} (1/n_1)^2 & f_{63}E_3 & f_{41}E_2 \\ f_{63}E_3 & \left(\frac{1}{n_1}\right)^2 & f_{41}E_1 \\ f_{41}E_2 & f_{41} \cdot E_1 & \left(\frac{1}{n_3}\right) \end{bmatrix}$$

In this term: $E_1$, $E_2$, $E_3$ denote the components of the vector of the applied electric field strength oriented according to the three mutually perpendicular axes 1, 2 and 3 of the crystal. The value $n_1$ is the refraction index of the crystal in field-free condition for light with the displacement-(D) vector, which for the main directions coincide with the field-strength-(E) vector, in the direction 1 and hence also with the direction 2, which in this case is equivalent to the direction 1; and $n_3$ is the corresponding refraction index for light with the E-vector in the direction 3. The magnitudes $f$ are the electro-optical moduli which result from the electro-optical and the elasto-optical effect in the electric field; these magnitudes can be determined by computation in a known manner.

By multiplication of the terms in equation (1), according to known principles of matrix mathematics, it is possible to obtain the index ellipsoid from which it is possible to read off the optical properties of the field-free crystal as well as of the crystal located in the electrical field $E_1$, $E_2$, $E_3$, for any orientation of the wave-normal direction of the beam with respect to the crystal and its polarizing direction.

The ellipsoid defined by the foregoing equation (1), applying to KDP constitutes, relative to the field-free crystal $E=0$, a rotational ellipsoid (ellipsoid of revolution) whose rotational axis coincides with the crystal axis 3 in the direction (001). Consequently, intersections of the ellipsoid with the plane (001) constitute circles. When an extraneously produced electrical field is present in the crystal $E \neq 0$, multiplication of the terms in Equation (1) results in the occurrence of terms $x_i \cdot x_j$ for $i \neq j$, and an intersection of the ellipsoid $$1 = \frac{x_1^2 + x_2^2}{n_1^2} + \frac{x_3^2}{n_3^2} + 2\{x_2x_3f_{41}E_1 + x_3x_1f_{41}E_2 + x_2x_1f_{63}E_3\} \quad \text{(Eq. 2)}$$

with the (001)-plane now resulting in a sectional ellipse which is rotated 45° relative to the coordinate cross of the axes (100) and (010).

Consequently, from this sectional ellipse, in the case of KDP, when applying a field $E_3 \neq 0$, $E_1 = E_2 = 0$ and for a ray having a normal in the direction ($\pm 1, \pm 1, 0$), i.e. in the direction of one of the short axes of the rotated sectional ellipse, by multiplication of the equation for the index ellipsoid in which however $X_3 = 0$ is inserted, there is obtained the field-responsive refraction index:

$$n = \frac{n_1}{(1 + f + f_{63}n_1^2 E_3)^{1/2}} \quad \text{(Eq. 3)}$$

applying to the proportion of the beam that has a polarizing direction (D-vector) parallel to the other main axis of the sectional ellipse. The refraction index $n_3$ is obtained analogously. Its value for the proportion of a beam that is polarized perpendicularly to the plane (001), is found to be independent of the applied field. Also with respect to the wave-normal in the direction (00±1) there results a field-responsive dependence of the refraction index for the KDP crystal, i.e. an electrical double refraction, as is apparent from the equation for the index ellipsoid. In addition, it may be mentioned that the beam direction and the wave-normal direction, as well as the D-vector and the E-vector of the radiation will always coincide when the crystal is traversed by the wave normal in the direction of a main axis or in a direction equivalent to a main axis.

Corresponding results are obtained when $E_1$ and/or $E_2 \neq 0$ and $E_3 = 0$. Relative to $E_1$ and $E_2$ the module $f_{41}$ occurs in the terms for the refraction index. Depending upon the magnitude of the moduli $f_{41}$ and $f_{63}$ or further moduli $f_{ij}$ in other crystal classes having still less symmetry, a correspondingly lower or higher field-responsive deflection sensitivity is exhibited.

The electro-optical constants are dependent upon temperature. They attain particularly high values in the vincinity of the conversion temperature of the crystal lattice, for example the Curie temperature. For example, in KDP the value of $f_{63}$ is larger by about $10^3$ than at room temperature. The field-responsive change of the refraction index therefore is particularly large at temperatures near the Curie temperature.

The Curie temperature is the temperature value that results from the Curie-Weiss law for the behavior of material constants, for example the dielectric constant, above this temperature in the form $$\epsilon \sim \frac{1}{T - \theta}$$

For the controllable deflection it is preferable to employ a material whose crystal-conversion temperature, particularly the Curie temperature, at which a great increase in the value of the electro-optical modulus or moduli occurs, is approximately in the range of normal room temperature. This is the case, for example, in deuterium-subsitituted ammonium dihydrogen arsenate in which the hydrogen is largely or completely replaced by deuterium.

In addition to the above-described linear electro- or magneto-optical effect there is also an effect that depends upon the square of the field strength and which can be described in a similar manner as the linear effect. In KDP the additional effect is relatively small compared with the linear effect. For materials in which the square-law effect attains an appreciable magnitude it can also be utilized analogously for the purpose of the method according to the invention.

For effecting a controllable deflection of the light beam by utilization of the electro- or magneti-optical effect according to the invention, the crystal is traversed by the beam in a wave-normal direction. The light is linearly polarized in a direction such that the defraction index for this beam, in accordance with the equation for the index ellipsoid and as shown above for the example of KDP, is a function of the applied field strength, without necessitating in the case of polarized light, separation into an ordinary and an extraordinary beam. As shown above, this applies to KDP, for example with respect to a beam extending in the (110)-direction polarized in a plane parallel to the (001)-plane. Such a beam is defracted at the interface between crystal and the adjacent medium, for example air, at an angle corresponding to the refraction law $\sin \varphi_1 = n \cdot \sin \varphi_2$, wherein $\varphi_1$ and $\varphi_2$ denote the respective angles between the wave normal and the respective perpendicular lines drawn upon the direction of incidence and refraction (emergence) prior and after refraction of the beam, and wherein $n = n_2/n_1$ is the ratio of the refraction indices, $n_2$ and $n_1$ of the adjacent media in which the angles $\varphi_1$ and $\varphi_2$ are located.

Since as shown above, the refraction index of the crystal for the beam is a function of the applied electrical field strength, the beam passing through the crystal is subjected to a field-strength dependent directional deflection, provided the planes of incidence and emergence are not parallel to each other. Such an electrical deflection is particularly suitable for intensively monochromatic laser radiation because the refraction indices of the material, generally, are functions of the frequency of the electromagnetic radiation (dispersion). Consequently, the method of deflection according to the invention is of particular practical importance when employing laser radiation on account of the absence of disturbances due to dispersion, as will occur with a non-monochromatic radiation. The preference for linearly polarized light is based, inter alia, upon energy reasons, but is not compulsory and generally does not constitute a limitation, particularly with respect to laser devices, because with a suitable arrangement, laser and laser-active material, a polarized light is emitted anyhow.

It should be noted that other substances than those mentioned are suitable for the prisms according to the invention. Basically, all substances, gases, liquids and solid bodies have refraction indices which in some ways depend upon the magnetic and electrical field strength. However, in many cases the effects are very small so that these substances can be completely disregarded for executing the process of the invention. In some cases, the necessary effects can be produced only with electric fields that are so high as to initiate gas discharge. Also, such substances as would strongly absorb the electro-magnetic rays to be refracted are unsuitable for the process according to the invention.

Field dependence of the refraction index is primarily very small in gases and vapors because of their low density. However, it is particularly great in substances that are known to be electrically and/or mangnetically birefringent. Thus, these substances are most suitable. Such substances as well as appertaining data can be found in such references as Landolt, Börnstein; Voigt, Magneto- and Electro-optic, published by Teubner 1908; Pockels, Kristalloptic, published by Teubner 1908.

An electrically birefringent gas is examplified by carbon dioxide. Examples of electrically birefringent liquids are nitrobenzol and carbon disulfide, the latter particularly favorable for high frequencies. Magnetically birefringent liquids are benzol, toluol, monobromonaphthaline and nitrobenzol.

However, solid bodies are most suitable for the method according to the invention, especially those solid bodies that exhibit a linear electro- or magneto-optical effect of the dielectricity constants. Particularly suitable solid substances are potassium dihydrogen phosphate (KDP) and ammonium dihydrogen phosphate (ADP), as well as other alkali dihydrogen phosphates or arsenates. In addition to these, other similarly constructed substances which do not absorb the rays too strongly are suitable. Cu-1-chloride is also suitable. These substances can be used at high frequencies, for example Gc.p.s.

In place of a simple wave guide of FIG. 2, it is possible to use a wave guide resonator.

While embodiments of the invention have been disclosed in detail, it will be obvious to those skilled in the art that the invention may be otherwise embodied within its spirit and scope.

I claim:

1. An apparatus comprising a deflector prism having a field-responsive refraction index, means for projecting a monochromatic convergent beam through one face of said deflector prism so as to converge on another face of said prism, said projection means projecting said beam in such direction that the field-free prism refracts the mid-ray of the beam along the other face of said prism, variable field generator means for subjecting said prism to a varying field so as to vary the intensity of the emergent part of the beam by varying its refraction index and thereby vary the emergence angle of the beam, and lens means for forming a beam of parallel rays from said emergent beam.

2. An apparatus comprising a deflector prism having a field-responsive refraction index, means for projecting a monochromatic convergent beam through one face of said deflector prism so as to converge on another face of said prism, said projection means projecting said beam in such direction that the field-free prism refracts the midray of the beam along the other face of said prism, a second prism arranged in the path of those rays of the beam which are reflected by the second face of said deflector prism for changing the path of the reflected rays, variable field generator means for subjecting said prism to a varying field so as to vary the intensity of the emergent part of the beam by varying its refraction index and thereby vary the emergence angle of the beam, and lens means for forming a beam of parallel rays from said emergent beam.

3. Apparatus for the transmission of communications by polarized amplitude-modulated closely convergent laser radiation, comprising a deflector prism having one of an electrical and magnetic field-responsive refraction index, said deflector prism comprising solid material;

a diaphragm having an opening of determined size spaced from but in operative proximity with said deflector prism;

means for projecting a convergent monochromatic laser beam through said deflector prism and thence through the opening of said diaphragm to provide an amplitude-modulated output radiation beams, said laser beam being deflected by said deflector prism at an angle of deflection having a vertex at a surface of said deflector prism; and radiation beam collector means spaced from but in operative proximity with said diaphragm, said radiation beam collector means having an input focal point coincident with the vertex of the angle of deflection of said laser beam from said deflector prism.

4. Apparatus as claimed in claim 3, wherein said laser beam deflected by said deflector prism has a cross-sectional area and the size of the opening of said diaphragm is substantially equal to said cross-sectional area.

References Cited

UNITED STATES PATENTS

| | | | |
|---|---|---|---|
| 1,264,374 | 4/1918 | De Florez | 350—160 |
| 1,923,891 | 8/1933 | Skaupy | 350—160 |
| 3,177,770 | 4/1965 | Okaya | 350—160 |
| 3,208,342 | 9/1965 | Nethercot | 350—160 |
| 3,238,843 | 3/1966 | Heller | 350—160 |

OTHER REFERENCES

Schmidt: "The Problem of Light Beam Deflection at High Frequencies," Optical Processing of Information, Oct. 23, 1962, pp. 98–103.

JEWELL H. PEDERSEN, *Primary Examiner.*

E. S. BAUER, R. L. WILBERT, *Assistant Examiners.*